(12) United States Patent
Propheter-Hinckley

(10) Patent No.: US 8,834,109 B2
(45) Date of Patent: Sep. 16, 2014

(54) VANE ASSEMBLY FOR A GAS TURBINE ENGINE

(75) Inventor: Tracy A. Propheter-Hinckley, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 555 days.

(21) Appl. No.: 13/196,969

(22) Filed: Aug. 3, 2011

(65) Prior Publication Data

US 2013/0034434 A1  Feb. 7, 2013

(51) Int. Cl.
 *F01D 9/04*  (2006.01)

(52) U.S. Cl.
 CPC ............ *F01D 9/042* (2013.01); *F05D 2230/64* (2013.01); *F05D 2260/30* (2013.01)
 USPC ......................................... 415/191; 415/211.2

(58) Field of Classification Search
 CPC  F01D 25/246; F05D 2230/64; F05D 2260/30
 USPC ............................................... 415/191, 211.2
 See application file for complete search history.

(56) References Cited

U.S. PATENT DOCUMENTS

| 4,286,921 | A | 9/1981 | Donlan et al. |
| 6,261,058 | B1 | 7/2001 | Kataoka et al. |
| 6,325,593 | B1 * | 12/2001 | Darkins et al. ................ 415/115 |
| 2009/0208332 | A1 * | 8/2009 | Weinstein et al. ......... 415/209.3 |

FOREIGN PATENT DOCUMENTS

WO  2011047693 A1  4/2011

\* cited by examiner

*Primary Examiner* — Edward Look
*Assistant Examiner* — Juan G Flores
(74) *Attorney, Agent, or Firm* — Carlson, Gaskey & Olds

(57) ABSTRACT

A vane assembly for a gas turbine engine includes a first vane and a second vane. The first vane and the second vane include an inner platform, an outer platform and an airfoil that extends between the inner platform and the outer platform. The first vane and the second vane are attached at least at one of their inner platforms or their outer platforms with a first attachment mechanism and a second attachment mechanism.

21 Claims, 5 Drawing Sheets

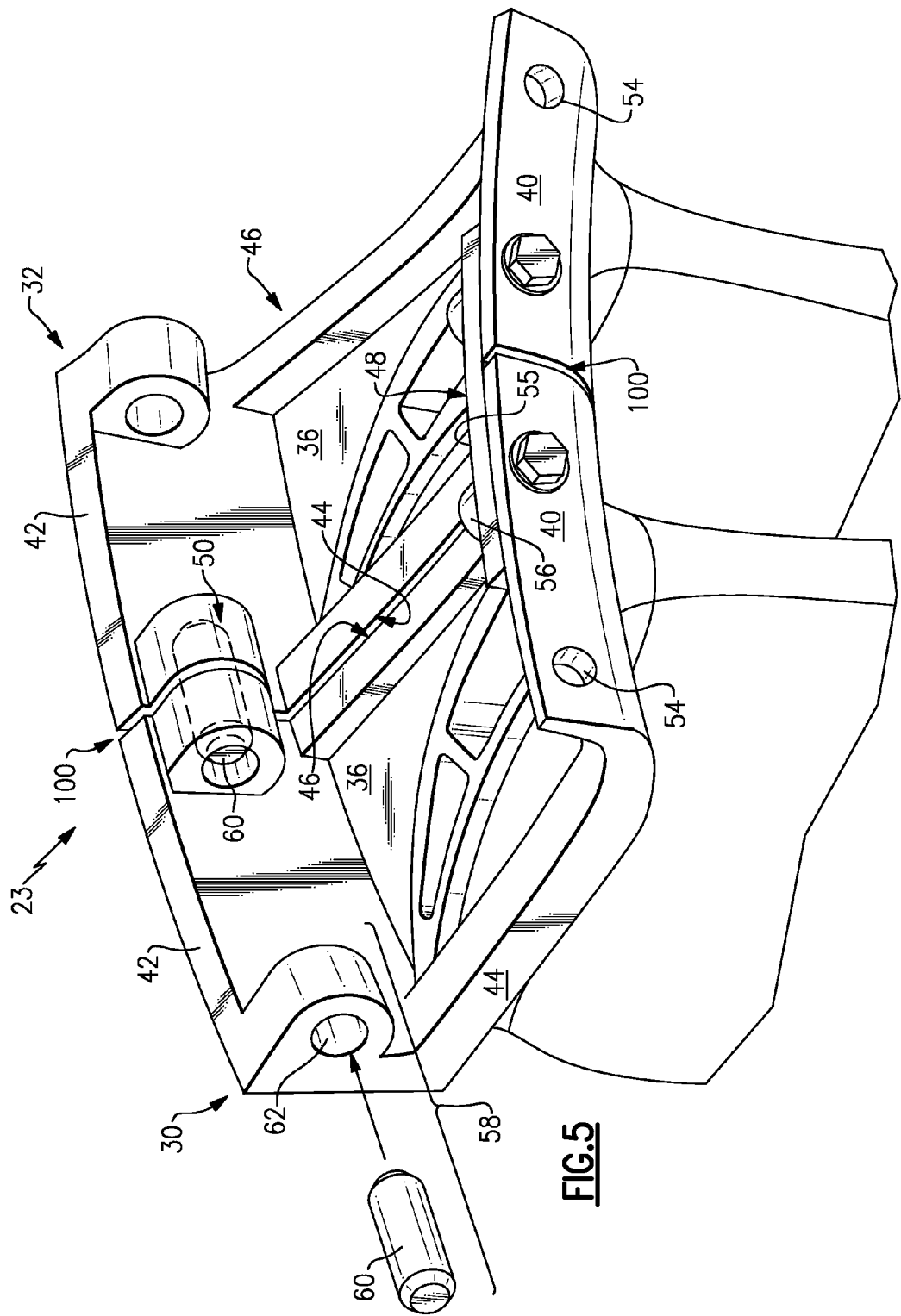

VANE ASSEMBLY FOR A GAS TURBINE ENGINE

This invention was made with government support under Contract No. FA8650-09-D-2923-DO 0013 awarded by the United States Air Force. The government has certain rights in this invention.

BACKGROUND

This disclosure relates to a gas turbine engine, and more particularly to a vane assembly for a gas turbine engine.

Gas turbine engines, such as those which power modern commercial and military aircraft, typically include a compressor section, a combustor section and a turbine section. During operating, air is pressurized in the compressor section and mixed with fuel and burned in the combustor section to generate hot combustion gases. The hot combustion gases flow through the turbine section which extracts energy from the hot combustion gases to power the compressor section and other gas turbine engine loads.

The compressor section and the turbine section of the gas turbine engine typically include alternating rows of rotating blades and stationary vanes. The rotating blades extract the energy from the hot combustion gases communicated through the gas turbine engine, and the stationary vanes convert the velocity of the airflow into pressure and prepare the airflow for the next set of blades. The plurality of vanes of each stage can be mechanically attached relative to one another to create a full ring vane assembly.

SUMMARY

A vane assembly for a gas turbine engine includes a first vane and a second vane. Each of the first vane and second vane includes an inner platform, an outer platform and an airfoil that extends between the inner platform and the outer platform. The first vane and the second vane are attached at either their inner platforms or their outer platforms with a first attachment mechanism and a second attachment mechanism.

In another exemplary embodiment, a vane assembly for a gas turbine engine includes a plurality of vanes each having a platform that axially extends between a leading edge rail and a trailing edge rail. Each vane of the plurality of vanes is mechanically attached to an adjacent vane at either the leading edge rail or the trailing edge rail.

In yet another exemplary embodiment, a method for providing a vane assembly for a gas turbine engine includes attaching adjacent vanes of the vane assembly at either an inner platform or an outer platform with a first attachment mechanism and a second attachment mechanism.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5 illustrates yet another vane assembly.

DETAILED DESCRIPTION

Figure 1:
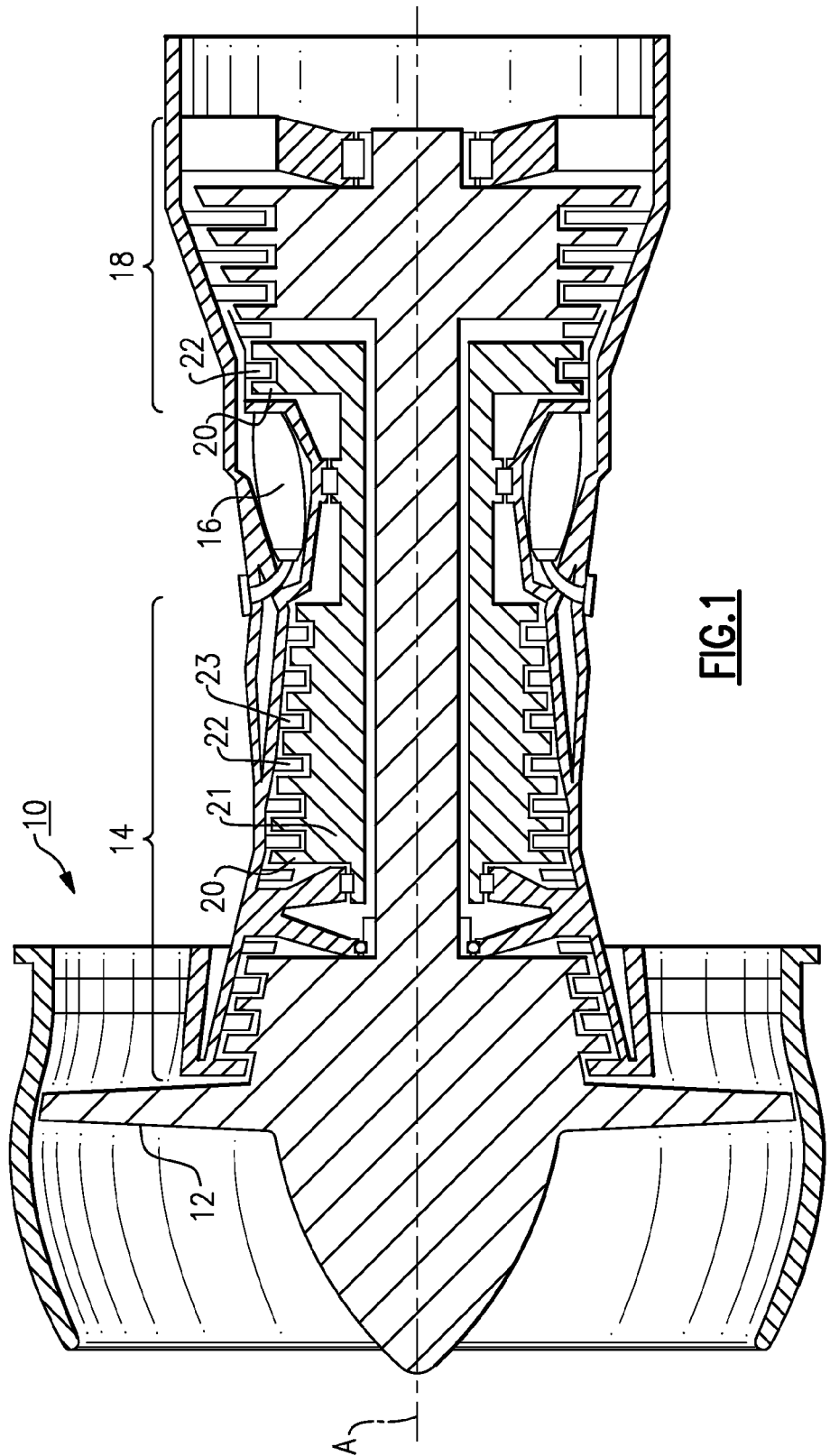
FIG. 1 shows a schematic view of the gas turbine engine.

FIG. 1 illustrates an example gas turbine engine 10 that is circumferentially disposed about an engine centerline axis A. The gas turbine engine 10 includes (in serial flow communication) a fan section 12, a compressor section 14, a combustor section 16 and a turbine section 18. During operation, air is compressed in the compressor section 14 and is mixed with fuel and burned in the combustor section 16. The combustion gases from the combustor section 16 are discharged through the turbine section 18, which extracts energy from the combustion gases for powering the compressor section 14, the fan section 12, and other gas turbine engine loads.

The compressor section 14 and the turbine section 18 include alternating rows of rotor assemblies 21 and vane assemblies 23. The rotor assemblies 21 include a plurality of rotating blades 20, while each vane assembly 23 includes a plurality of stator vanes 22. The blades 20 of the rotor assemblies 21 create or extract energy (in the form of pressure) from the airflow that is communicated through the gas turbine engine 10. The vanes 22 direct airflow to the blades 20 to either add or extract energy. Adjacent vanes 22 of the vane assembly 23 can be attached to one another in order to provide a more uniform surface for applying coatings and to avoid vane tipping.

This view is highly schematic and is included to provide a basic understanding of a gas turbine engine and not to limit the disclosure. This disclosure extends to all types of gas turbine engines and for all types of applications.

Figure 2:
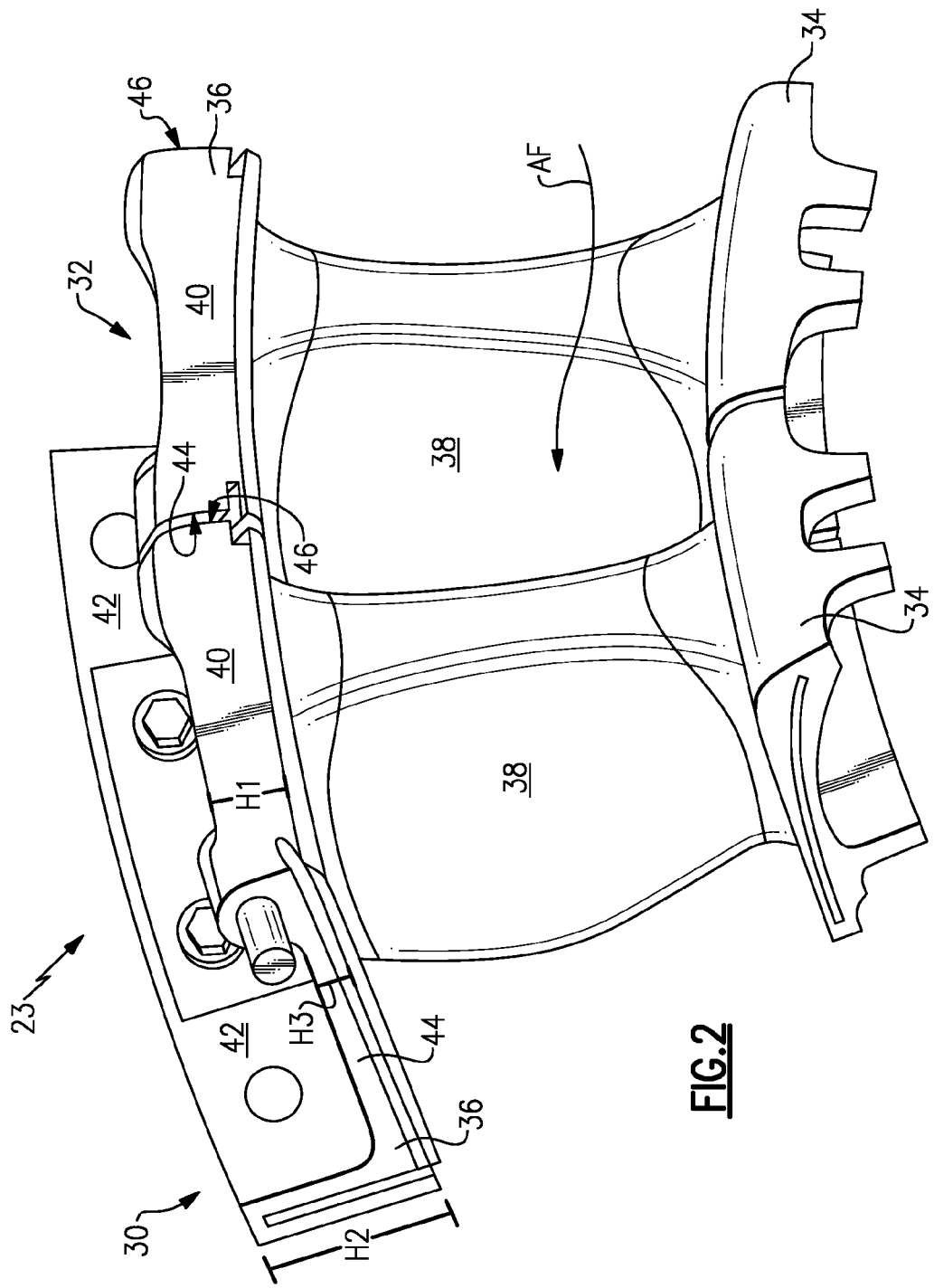
FIG. 2 illustrates a vane assembly for a gas turbine engine.

FIG. 2 illustrates a portion of an example vane assembly 23 of the gas turbine engine 10. In this example, the vane assembly 23 is a vane assembly of the turbine section 18. However, the example vane assembly 23 can be incorporated into other sections of the gas turbine engine 10, including but not limited to, the compressor section 14.

The vane assembly 23 includes a first vane 30 and a second vane 32 that is adjacent to the first vane (i.e., an adjacent vane). Although only two vanes are illustrated by FIG. 2, it should be understood that the vane assembly 23 could include a plurality of vanes that are annularly disposed about the engine centerline axis A to form a full ring assembly. As used in this disclosure, the term "vane" includes fixed vanes or variable vanes that rotate to change a flow area associated with the vane.

The first vane 30 and the second vane 32 each include an inner platform 34 (on an inner diameter side) and an outer platform 36 (on an outer diameter side). An airfoil 38 extends in span between the inner platform 34 and the outer platform 36. The inner platforms 34 and the outer platforms 36 each include a leading edge rail 40, a trailing edge rail 42, and opposing mate faces 44, 46 that extend axially between the leading edge rails 40 and the trailing edge rails 42. Airflow AF is communicated in a direction from the leading edge rail 40 toward the trailing edge rail 42 during engine operation.

The airfoils 38 extend in chord between the leading edge rails 40 and the trailing edge rails 42. The leading edge rails 40 define a first height H1, the trailing edge rails define a second height H2, and the mate faces 44, 46 define a third height H3. The heights H1, H2 and H3 are different heights, and in this example the height H3 is smaller than heights H1 or H2. The mate faces 44, 46 abut mate faces of adjacent vanes of the vane assembly 23 when assembled in a full ring assembly. For example, FIG. 2 illustrates that the mate face 46 of the first vane 30 abuts the mate face 44 of the second vane 32 when mechanically attached. The first and second vanes 30, 32 are attached (i.e., coupled to one another) with one or more attachment mechanisms, as is discussed in greater detail below.

Figure 3:
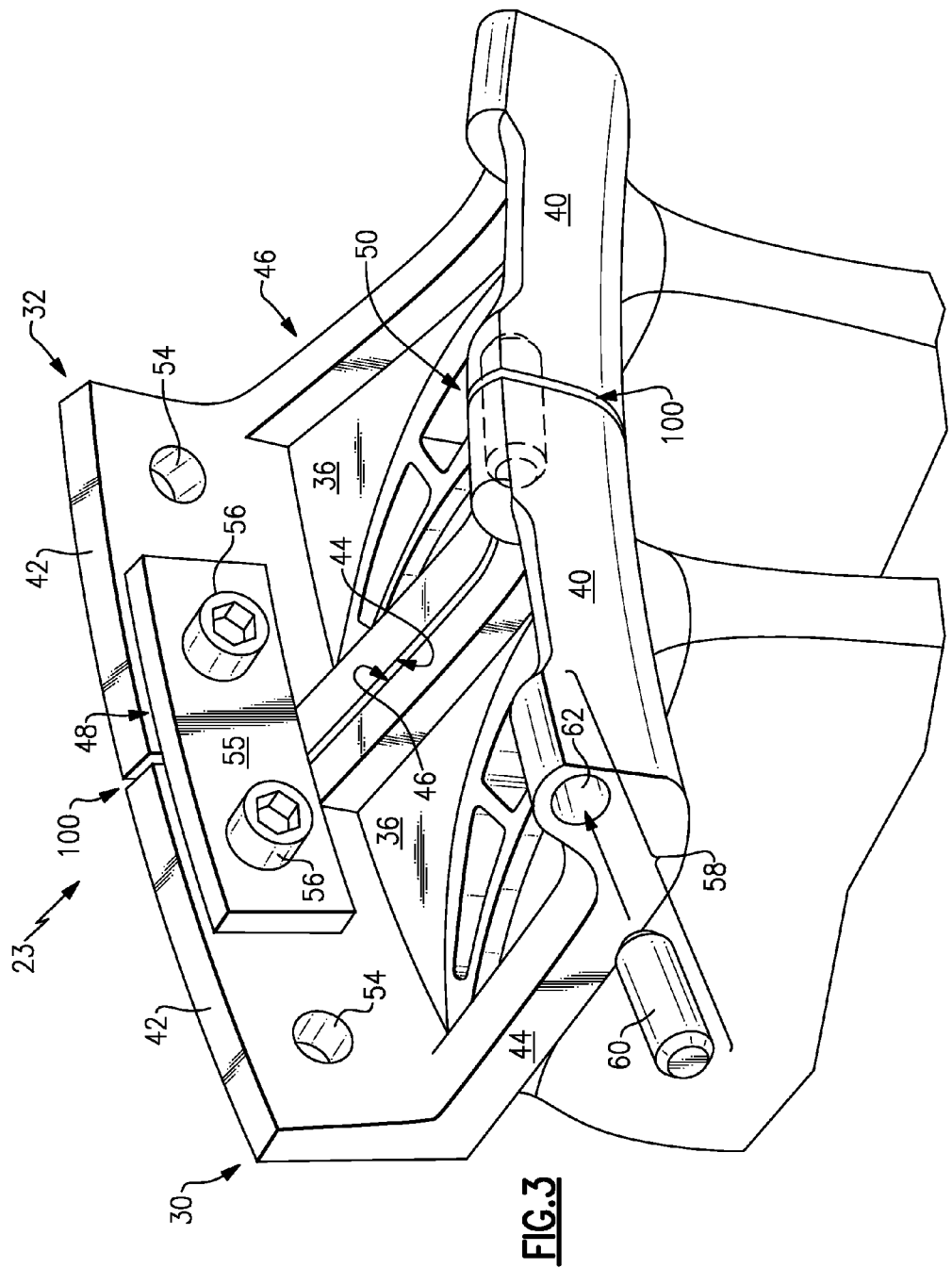
FIG. 3 illustrates a portion of the vane assembly of FIG. 2.

Referring to FIG. 3, the vane assembly 23 includes a first attachment mechanism 48 and a second attachment mechanism 50. The first attachment mechanism 48 and the second attachment mechanism 50 can be the same or different mechanism (different mechanisms are shown by FIG. 3). The first attachment mechanism 48 and the second attachment mechanism 50 mechanically attach the first vane 30 and the second vane 32 (i.e. adjacent vanes).

Figure 4:
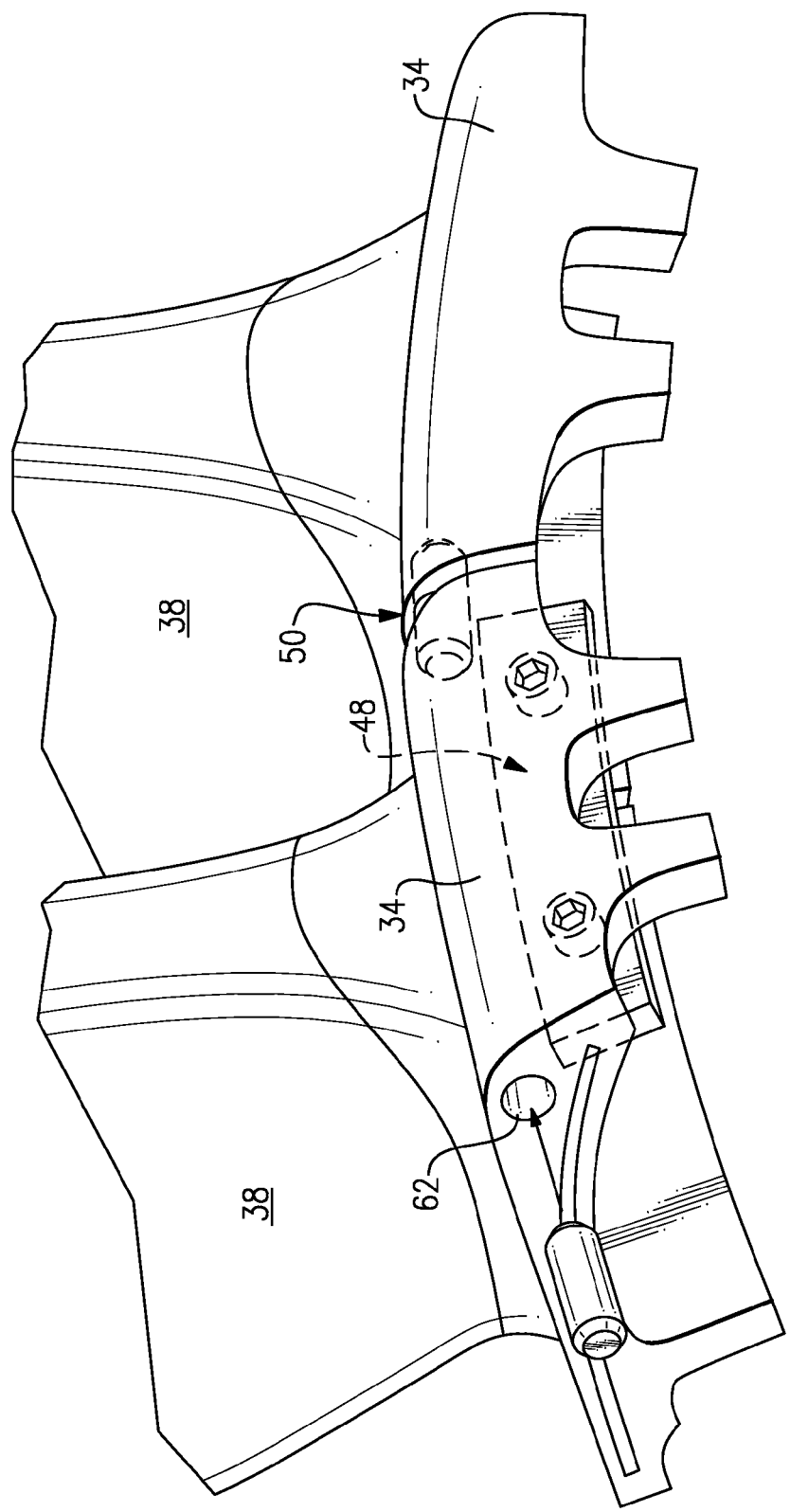
FIG. 4 illustrates another vane assembly.

In this example, the first attachment mechanism 48 and the second attachment mechanism 50 couple the outer platforms 36 of the first vane 30 and the second vane 32, while the inner platforms 34 are not coupled and therefore do not include any attachment mechanisms. Such an arrangement avoids over-constraining the vane assembly 23. However, it should be understood that an alternative configuration is contemplated as within the scope of this disclosure in which the first and second attachment mechanisms 48, 50 couple the inner platforms 34 of adjacent vanes (here, the first and second vanes vane 30, 32) and the outer platforms 36 are de-coupled. (See FIG. 4).

The first attachment mechanism 48 is positioned relative to the trailing edge rails 42 of the first vane 30 and the second vane 32, while the second attachment mechanism 50 is positioned relative to the leading edge rails 40 of the first vane 30 and the second vane 32. In other words, the first attachment mechanism 48 couples the trailing edge rails 42 of adjacent vanes and the second attachment mechanism couples the leading edge rails 40 of adjacent vanes. It should be understood that an opposite configuration is also contemplated in which the first attachment mechanism 48 is positioned at the leading edge rails 40 and the second attachment mechanism 50 is positioned relative to the trailing edge rails 42 (see FIG. 5). The first attachment mechanism 48 bridges a parting line 100 (i.e., split line) that extends between the first vane 30 and the second vane 32, and extends across a portion of the trailing edge rails 42 (or, in the FIG. 5 embodiment, across the leading edge rails 40), of both the first vane 30 and the second vane 32.

A plurality of attachment openings 54 extend through the trailing edge rails 42 of the first vane 30 and the second vane 32 for securing the first attachment mechanism 48 relative to the first vane 30 and the second vane 32. The first attachment mechanism 48 can include a bracket 55. The bracket 55 is attached to the trailing edge rails 42 of the first vane 30 and the second vane 32 via fasteners 56, such as bolts, for example. The bracket 55 can also be integrally cast as part of the trailing edge rails 42 of the first vane 30 and the second vane 32.

The second attachment mechanism 50 of this exemplary embodiment includes a pin-socket connector 58. The pin-socket connector 58 includes a pin 60 and corresponding sockets 62 that receives the pin 60 to stabilize the leading edge rails 40 of the adjacent first vane 30 and second vane 32 (or, alternatively, the trailing edge rails 42 in the FIG. 5 embodiment). The pin 60 is received in the sockets 62, which are either machined or cast as part of the first and second vanes 30, 32. In this example, the sockets 62 are machined as part of the inner or outer platform 34, 36. The sockets 62 could also be cast features. The pin 60 bridges the parting line 100 that extends between the first vane 30 and the second vane 32 when the first vane 30 and the second vane 32 are mechanically attached.

The first attachment mechanism 48 and the second attachment mechanism 50 together mechanically attach and couple the first vane 30 relative to the second vane 32. The mate faces 44, 46 of each of the first vane 30 and the second vane 32 are free of attachment openings 54, although the sockets 60 are partially disposed through the mate faces 44, 46.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vane assembly for a gas turbine engine, comprising:
   a first vane;
   a second vane, wherein each of said first vane and said second vane includes an inner platform, an outer platform and an airfoil that extends between said inner platform and said outer platform, and
   wherein said first vane is attached to said second vane at least at one of said inner platforms and said outer platforms with a first attachment mechanism and a second attachment mechanism; wherein at least one of said first attachment mechanism and second attachment mechanism includes a bracket.

2. The vane assembly as recited in claim 1, wherein each of said inner platforms and said outer platforms include a leading edge rail and a trailing edge rail.

3. The vane assembly as recited in claim 2, wherein said first attachment mechanism mechanically attaches one of said leading edge rails and said trailing edge rails of said first vane and said second vane and said second attachment mechanism mechanically attaches the other of said leading edge rails and said trailing edge rails of said first vane and said second vane.

4. The vane assembly as recited in claim 2, wherein mate faces extend between said leading edge rails and said trailing edge rails of said first vane and said second vane.

5. The vane assembly as recited in claim 4, wherein said mate faces are free of attachment openings.

6. The vane assembly as recited in claim 2, comprising a plurality of attachment openings that extend through one of said leading edge rails and said trailing edge rails of said first vane and said second vane.

7. The vane assembly as recited in claim 2, wherein said airfoils extend in chord between said leading edge rails and said trailing edge rails.

8. The vane assembly as recited in claim 1, wherein said bracket bridges a parting line between said first vane and said second vane.

9. The vane assembly as recited in claim 1, wherein said vane assembly is incorporated in a turbine section of said gas turbine engine.

10. The vane assembly as recited in claim 1, wherein said vane assembly is incorporated in a compressor section of said gas turbine engine.

11. The vane assembly as recited in claim 1, wherein said first attachment mechanism is a different mechanism than said second attachment mechanism.

12. The vane assembly as recited in claim 11, wherein said vane assembly is incorporated in a compressor section of said gas turbine engine.

13. A vane assembly for a gas turbine engine, comprising:
    a plurality of vanes each having a platform that extends between a leading edge rail and a trailing edge rail, and each vane of said plurality of vanes is attached to an adjacent vane at least at one of said leading edge rail and said trailing edge rail with a first attachment mechanism including a bracket.

14. The vane assembly as recited in claim 13, wherein each vane of said plurality of vanes is mechanically attached to said adjacent vane with said first attachment mechanism and a second attachment mechanism that is different from said first attachment mechanism.

15. The vane assembly as recited in claim 14, wherein said first attachment mechanism mechanically attaches one of said leading edge rails and said trailing edge rails of each of said plurality of vanes and said second attachment mechanism mechanically connects the other of said leading edge rails and said trailing edge rails of each of said plurality of vanes.

16. The vane assembly as recited in claim 13, wherein said vane assembly is incorporated in a turbine section of said gas turbine engine.

17. A method for providing a vane assembly for a gas turbine engine, comprising the steps of:
    attaching adjacent vanes of the vane assembly at least at one of an inner platform and an outer platform with a first attachment mechanism and a second attachment mechanism; wherein at least one of said first attachment mechanism and second attachment mechanism includes a bracket.

18. The method as recited in claim 17, wherein each of the inner platform and the outer platform include a leading edge rail and a trailing edge rail, and comprising the step of:
    positioning one of the first attachment mechanism and the second attachment mechanism at the leading edge rail; and
    positioning the other of first attachment mechanism and the second attachment mechanism at the trailing edge rail to attach the adjacent vanes of the vane assembly.

19. The method as recited in claim 17, wherein the second attachment mechanism includes a pin-socket connector.

20. A vane assembly for a gas turbine engine, comprising:
    a first vane;
    a second vane, wherein each of said first vane and said second vane includes an inner platform, an outer platform and an airfoil that extends between said inner platform and said outer platform; and
    wherein said first vane is attached to said second vane at least at one of said inner platforms and said outer platforms with a first attachment mechanism and a second attachment mechanism, said first attachment mechanism including a bracket and said second attachment mechanism including a pin-socket connector.

21. A vane assembly for a gas turbine engine, comprising:
    a first vane;
    a second vane, wherein each of said first vane and said second vane includes an inner platform, an outer platform and an airfoil that extends between said inner platform and said outer platform;
    wherein said first vane is attached to said second vane at least at one of said inner platforms and said outer platforms with a first attachment mechanism and a second attachment mechanism; and
    wherein said first attachment mechanism includes a bracket and said second attachment mechanism includes a pin-socket connector, said bracket bridging a parting line between said first vane and said second vane.

* * * * *